United States Patent [19]

Bernett

[11] Patent Number: 5,555,211
[45] Date of Patent: Sep. 10, 1996

[54] IMPROVED SPINDLE SHAFT FOR ATTACHING A COVER IN A DISK DRIVE

[75] Inventor: Frank W. Bernett, Colorado Springs, Colo.

[73] Assignee: Quantum Corporation, Milpitas, Calif.

[21] Appl. No.: 377,122

[22] Filed: Jan. 23, 1995

[51] Int. Cl.⁶ .................................................. G11B 17/02
[52] U.S. Cl. ........................... 360/99.08; 360/99.12
[58] Field of Search ........................... 360/97.01, 97.03, 360/98.01, 98.07, 98.08, 99.08, 99.12

[56] References Cited

U.S. PATENT DOCUMENTS

| | | | |
|---|---|---|---|
| 4,578,726 | 3/1986 | Boehm | 360/105 |
| 4,717,977 | 1/1988 | Brown | 360/98 |
| 5,282,100 | 1/1994 | Tacklind et al. | 360/97.02 |
| 5,352,947 | 10/1994 | MacLeod | 310/67 R |

Primary Examiner—A. J. Heinz
Attorney, Agent, or Firm—David B. Harrison; John C. Chen

[57] ABSTRACT

A spindle shaft attachment technique for a disk drive includes a conical tip formed on, or added to, the top of the spindle shaft in order that it might be embedded in or contact a substantially planar, interior surface of the HDA cover at a location determined by the perpendicularity of the spindle as set by the baseplate without forcing the top of the spindle shaft to a predetermined screw hole or recessed cone location on the cover. The spindle shaft attachment technique disclosed allows for use of a relatively longer spindle shaft for a given height form factor drive and, therefore, allows a greater spacing between upper and lower spindle bearings resulting in greater stiffness and an increased rocking mode frequency.

20 Claims, 5 Drawing Sheets

IMPROVED SPINDLE SHAFT FOR ATTACHING A COVER IN A DISK DRIVE

BACKGROUND OF THE INVENTION

The present invention relates, in general, to a spindle shaft attachment technique for a disk drive. More particularly, the present invention relates to a technique for engagement of the spindle shaft with a relatively planar head disk assembly ("HDA") cover to allow for an increased spindle length and concomitantly greater bearing spacing to establish a relatively higher frequency spindle rocking mode for a given height form factor drive.

Disk drives are computer mass storage devices from which data may be read and/or to which such data may be written. In general, they comprise one or more randomly accessible rotating storage media, or disks, on which data is encoded by various means. In magnetic disk drives, data is encoded as bits of information comprising magnetic field reversals grouped in tracks on the magnetically-hard surface of the rotating disks. When multiple disks, or "platters" are incorporated in a given drive to increase overall storage capacity for a particular form factor, the disks are concentrically stacked in a generally parallel and spaced-apart relationship and affixed at their inner diameter ("ID") to a common hub which is rotationally coupled to a stationary spindle shaft by a pair of bearings.

In addition, a number of read/write heads are mounted on individual access arms interleaved with the individual disks which may be ganged together and attached to a common voice coil motor ("VCM") actuator rotationally coupled to an actuator spindle shaft. The VCM is capable of moving the combined head/arm assembly across the upper and lower disk surfaces at very high speeds to perform seek operations in order to read and/or write data to selected tracks and data sectors on the disks. Utilizing either dedicated, embedded or dedicated plus embedded servo techniques, the disk drive servo system accurately positions the read/write heads with respect to the individual data tracks.

Certain disk drive designs may incorporate cantilever designs for the actuator and disk stack in which the spindles are affixed to only the HDA baseplate. However, most high performance drives employ a design in which the spindle is attached to both the baseplate and cover in order to increase stiffness and improve runout characteristics. Although certain drives have utilized a conically shaped upper spindle tip to engage a corresponding fixed recessed cone machined in the HDA cover to provide the desired spindle stiffness, in most drives the spindles are secured to both the baseplate and cover with screws even though such fasteners may present assembly problems with torque control and stripping of the spindle shaft threads. Regardless, with either technique, tight manufacturing and assembly tolerances must be maintained in order to ensure that the perpendicularity of the actuator and disk stack spindles established by the drive baseplate is not altered by the fixed recessed cone or screws securing the upper end of the respective spindles as the cover is assembled to the baseplate.

With the growing trend toward even lower height form factor disk drives, the height of the screw heads in a typical drive also becomes a significant consideration in meeting drive height constraints. As a result the screws securing the upper end of the actuator and disk stack spindles must be recessed so as not to protrude above the plane of the drive cover. However, recessing the screw heads for a given drive height means that a shorter spindle must be utilized to accommodate the recessed upper screw with a concomitantly shorter spacing available between the upper and lower bearings supporting the hub or actuator on the spindle. Inasmuch as bearings have inherently limited stiffness themselves and exhibit many spring-like properties, shorter spacing between the upper and lower bearings results in reduced stiffness and a reduced rocking mode frequency.

Given the various excitation frequencies in an operating disk drive, whether due to defects and imperfections in the races and ball bearings or other factors, a lower rocking mode frequency can cause drive failure if it becomes coincident with these excitation frequencies, typically on the order of 500 Hz or less. On the other hand, if a relatively higher rocking mode frequency can be established, the problems of its coincidence with the drive excitation frequencies can be avoided.

SUMMARY OF THE INVENTION

Disclosed herein is a spindle shaft attachment technique for a disk drive applicable to both the actuator and disk stack spindles which obviates prior schemes for attaching the spindle to the HDA cover by means of screws or machined recessed cones which limit the length of the spindle shaft and introduce spindle perpendicularity problems in the assembly of the drive. The technique of the present invention allows for the use of a relatively longer spindle shaft for a given height form factor drive and, therefore, allows a greater spacing between upper and lower spindle bearings resulting in greater stiffness and an increased rocking mode frequency. As a consequence, manufacturing yields and drive reliability are improved with a spindle design that is straightforward and readily manufactured.

In a particular embodiment a point is formed on, or added to, the top of the spindle shaft in order that it might be embedded in the substantially planar, interior surface of the HDA cover at a location determined by the perpendicularity of the spindle as set by the baseplate without forcing the top of the spindle shaft to a predetermined screw hole or recessed cone location on the cover. The cover may be simply formed of stamped aluminum sheet metal or other suitable material without the necessity of machining, or concern for proper positioning of, such holes or cones with the point embedded in the cover by merely pressing the top toward the baseplate following assembly of the HDA. Should the HDA need to be refurbished or rebuilt, the inexpensive cover can be easily replaced with a new cover and the pressing process repeated following the rework process.

In an alternative embodiment, the top of the spindle shaft may be rounded, bevelled, conical or of a frustoconical shape such that the tip interacts with the substantially planar interior surface of the cover sufficiently to contact the same without forming an indentation yet still increases spindle stiffness and its relative rocking mode frequency.

Broadly, what has been provided is a computer mass storage device disk drive assembly including a data transducer positionable with respect to at least one rotating storage media disk affixed to a central hub rotationally secured to a substantially concentric spindle shaft. The assembly is disposed within an enclosure comprising a baseplate and corresponding cover with the spindle shaft being secured to the baseplate at a proximal end thereof and presenting an opposite distal end extending toward the cover. The improvement herein disclosed comprises a substantially conical tip disposed at the distal end of the spindle shaft adjoining the cover, the tip interacting with a substantially planar interior surface of the cover such that when the cover is assembled to the baseplate, the spindle shaft is maintained in a substantially fixed relationship therebetween. In a particular embodiment utilizing a pointed tip, the drive may further comprise an indentation in the interior surface of the cover corresponding to the conical tip formed by compressing the cover toward the baseplate during assembly of the disk drive.

Further disclosed herein is a method for assembling a computer mass storage device disk drive assembly disposed within an enclosure comprising a baseplate and cover, wherein the method comprises the steps of providing a spindle shaft having opposite proximal and distal ends thereof and disposing a conical tip at the distal end of the spindle shaft. The spindle shaft is secured to the baseplate at the proximal end thereof, and the cover is assembled to the baseplate such that a substantially planar interior surface of the cover interacts with the conical tip to maintain the spindle shaft in a substantially fixed relationship between the baseplate and cover. In a particular method for use with a disk stack spindle within the HDA, the method may further comprise the step of affixing at least one rotating storage media disk to a central hub rotationally surrounding the spindle shaft. An indentation may also be formed in the substantially planar interior surface of the HDA cover at an intersection point with the conical tip of the spindle shaft by compressing the cover and baseplate following assembly of the HDA.

BRIEF DESCRIPTION OF THE DRAWINGS

The foregoing and other features and objects of the present invention will become more apparent and the invention itself will be best understood by reference to the following description of a preferred embodiment taken in conjunction with the accompanying drawings, wherein.

DESCRIPTION OF A PREFERRED EMBODIMENT

Figure 1:
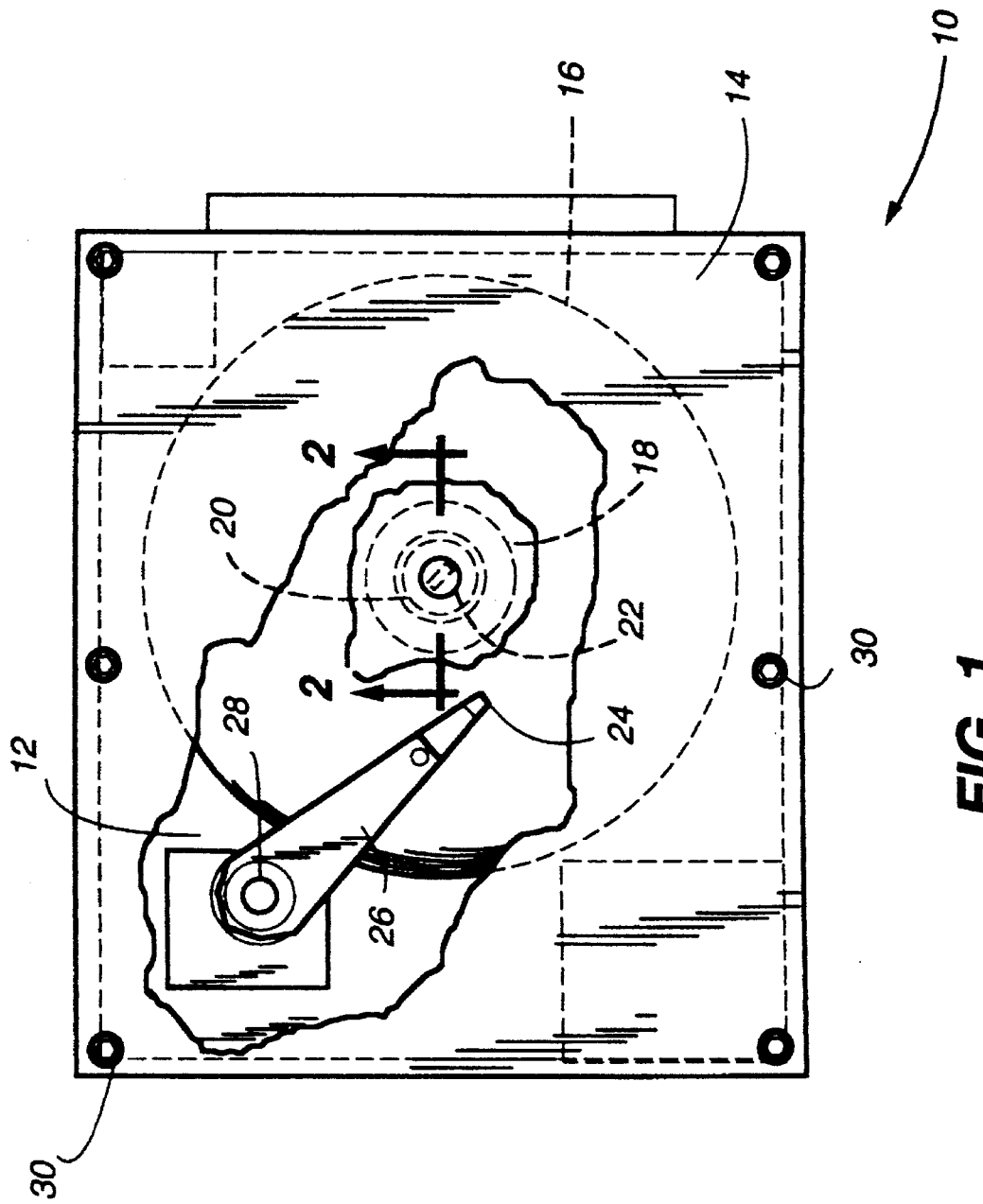
FIG. 1 is a partially cut-away, top plan view of a prior art disk drive HDA illustrating a portion of the disk stack and actuator arms with their associated spindles as rotatably attached to the drive baseplate.

With reference now to FIG. 1, a prior art disk drive 10 is shown. The disk drive 10 comprises a baseplate 12 and corresponding cover 14 which, in combination with various other internal components comprises an HDA.

The disk drive 10 includes one or more disks 16 secured at their ID to a hub 18 as shown. The hub 18 is pressed to the outer race of a bearing 20 which, in turn, is pressed at its inner race thereof to a spindle 22 comprising a stationary central shaft. A data transducer or read/write head 24 is affixed at the distal end of an access or actuator arm 26 for positioning the read/write head 24 with respect to the data tracks on the disk 16. The actuator arm 26 is rotationally coupled to an actuator spindle 28 by means of a voice coil motor (not shown). A number of screws 30 or other fasteners may be utilized to secure the cover 14 to the baseplate 12 to maintain a substantially contamination-free environment within the HDA.

In the embodiment of the prior art disk drive 10 shown, and as will be more fully described hereinafter, the upper end of the spindle 22 is secured to the cover 14 by means of a recessed screw in order to provide enhanced stiffness to the spindle assembly. In like manner, the actuator spindle 28 may also be secured to the cover 14 by means of a recessed screw (not shown).

Figure 2:
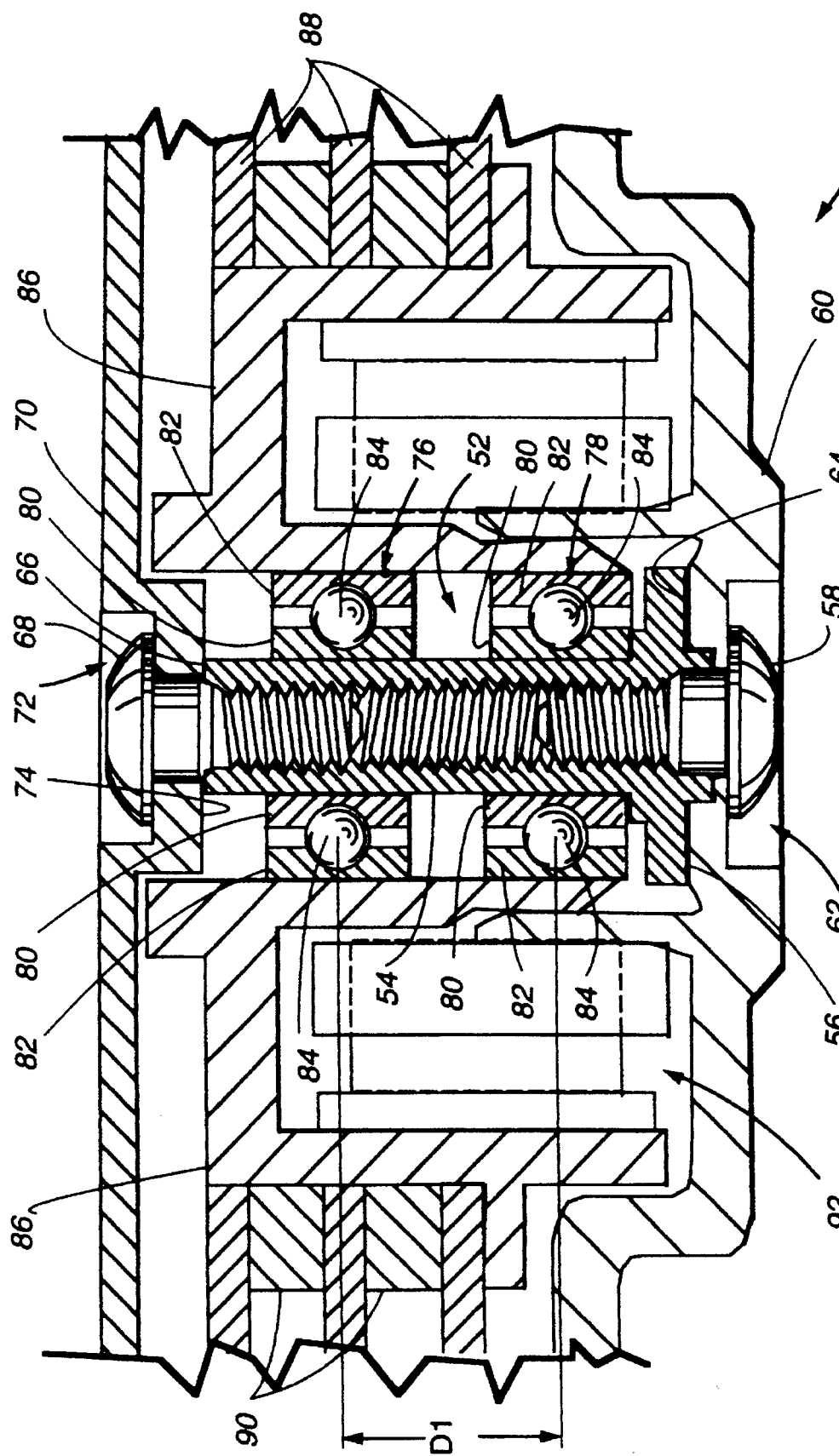
FIG. 2 is a partially cut-away, side elevation view of a prior art drive disk stack spindle and hub assembly taken substantially along section line 2—2 of FIG. 1 illustrating the attachment of the spindle central shaft to the baseplate and cover by means of a pair of recessed screws and illustrating a maximum spacing "D1" between the rotational centers of the upper and lower bearings allowed by the length of the central shaft due to the recessed cup adjoining the cover screw.

Referring now to FIG. 2, a prior art disk drive disk stack 50 is shown. The disk stack 50 comprises a spindle 52 which includes a longitudinally extending central shaft 54 extending between a proximal flanged end 56 secured to a baseplate 60 by means of a recessed screw 58. The head of the screw 58 is surrounded by a lower recess 62 formed within the structure of the baseplate 60. The flanged end 56 of the spindle 52 adjoins the baseplate inner surface 64 and the structures are formed to establish perpendicularity of the spindle 52 with respect to the plane of the baseplate 60.

The spindle 52 also presents a distal, top end 66 which is secured to a cover 70 by means of a screw 68 surrounded by a recessed cup 72 formed within the structure of the cover 70. The top end 66 of the spindle 52 adjoins a cup inner surface 74 as shown. Due to the presence of the recessed cup 72, the length of the central shaft 54 of the spindle 52 is reduced as will be more fully described hereinafter.

The disk stack 50 further comprises an upper bearing 76 and a corresponding lower bearing 78 disposed about the central shaft 54 of the spindle 52. The upper and lower bearings 76, 78 are separated at their rotational centers by a distance D1 dictated by the length of the central shaft 54 of the spindle 52. The upper and lower bearings 76, 78 comprise a fixed inner race 80 pressed or otherwise secured onto the central shaft 54 of the spindle 52 and a corresponding outer race 82 which rotates around the inner race 80 by means of a number of ball bearings 84 as shown. The outer race 82 of the upper and lower bearings 76, 78 is pressed or otherwise secured within the inner diameter of a hub 86 comprising an inverted toroidal element having a cup-shaped cross section. A number of disks 88 are secured to the hub 86 at their ID and are separated from one another by means of a number of spacers 90 as shown. A motor 92, which may comprise a conventional three-phase brushless DC motor, is disposed within the cup-shaped recess of the hub 86 for imparting rotational motion to the hub 86 about the central shaft 54 of the spindle 52.

Figure 3:
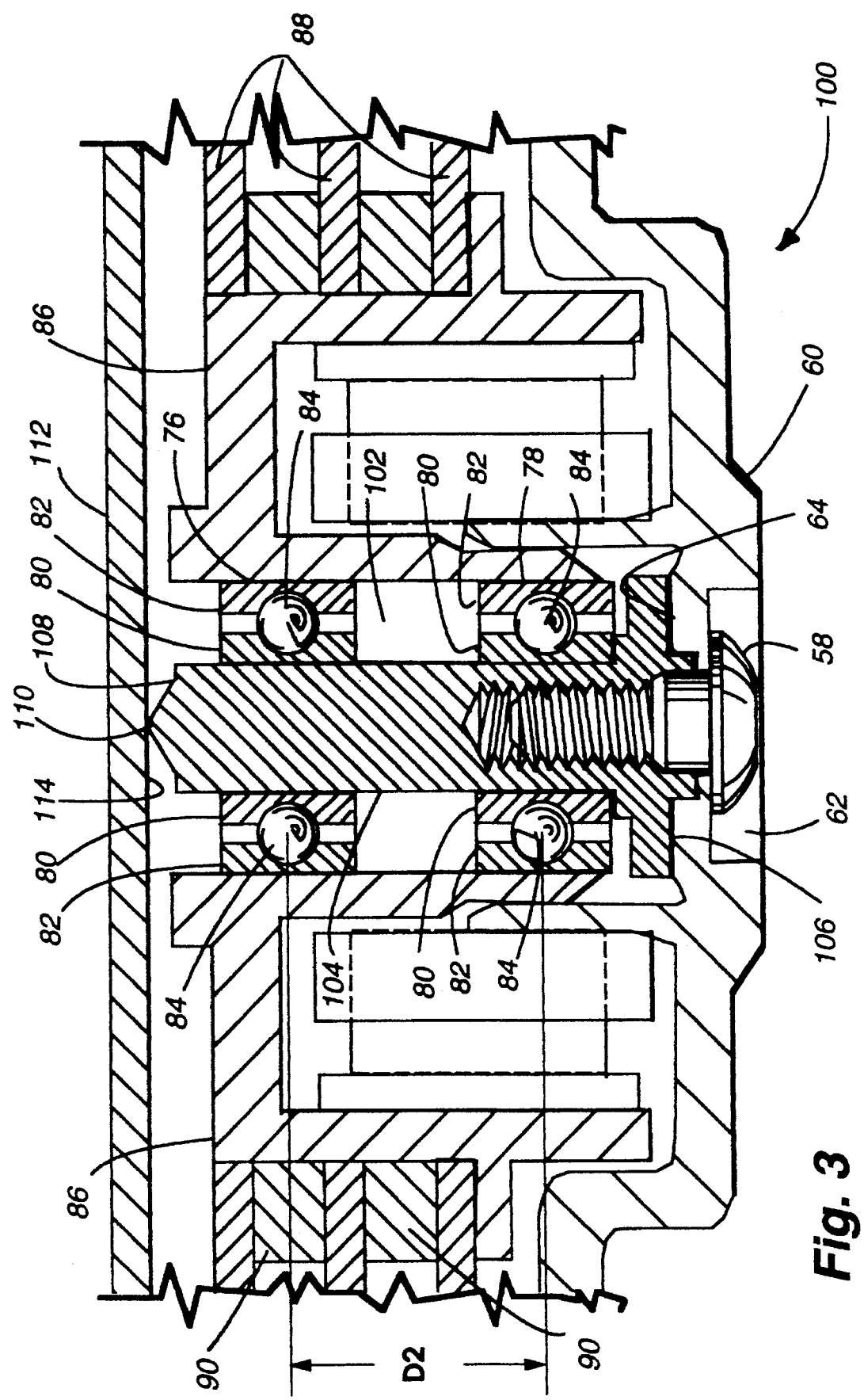
FIG. 3 is a partially cut-away, side elevational view of a portion of a disk drive in accordance with the present invention, illustrating the disk stack spindle and hub assembly and showing the interaction of the conical tip of the spindle central shaft to the substantially planar interior surface of the HDA cover before applying a compression force on the cover to embed the conical tip into the cover, and illustrating a relatively greater maximum spacing "D2" between the rotational centers of the upper and lower bearings allowed by increased length of the central shaft due to the absence of the recessed cup and screw head shown in FIG. 2.

With reference additionally now to FIG. 3, a portion of a disk drive 100 in accordance with the present invention is shown. With respect to the embodiment of disk drive 100 shown, corresponding structure to that previously described with respect to the disk stack 50 of FIG. 2 is like numbered and the foregoing description thereof shall suffice herefor.

Figure 4:
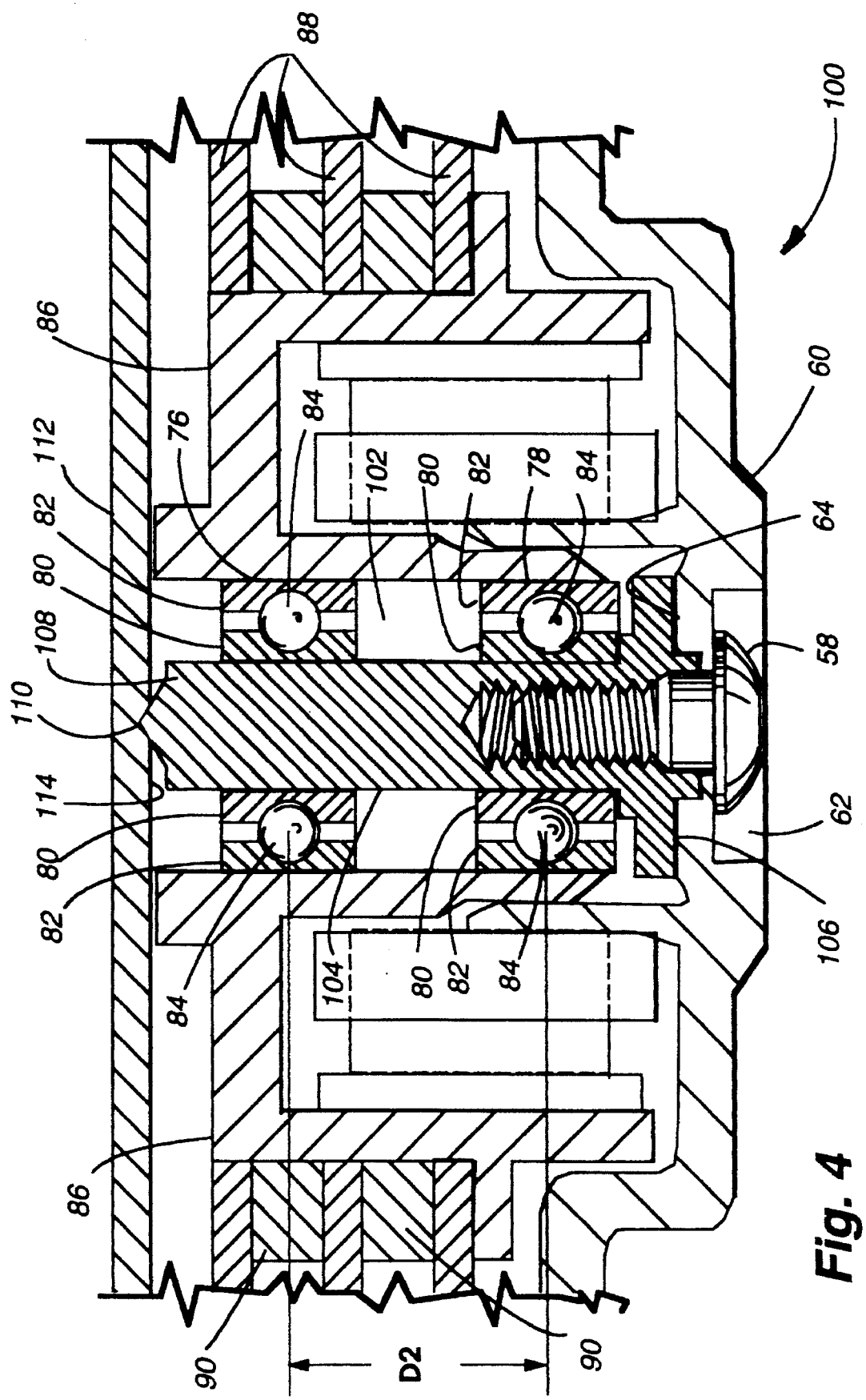
FIG. 4 is a partially cut-away, side elevational view similar to FIG. 3 illustrating the conical tip of the spindle shaft being imbedded into the substantially planar interior surface of the HDA cover after a compression force has been applied to the cover, in accordance with principles of the present invention.
Figure 5:
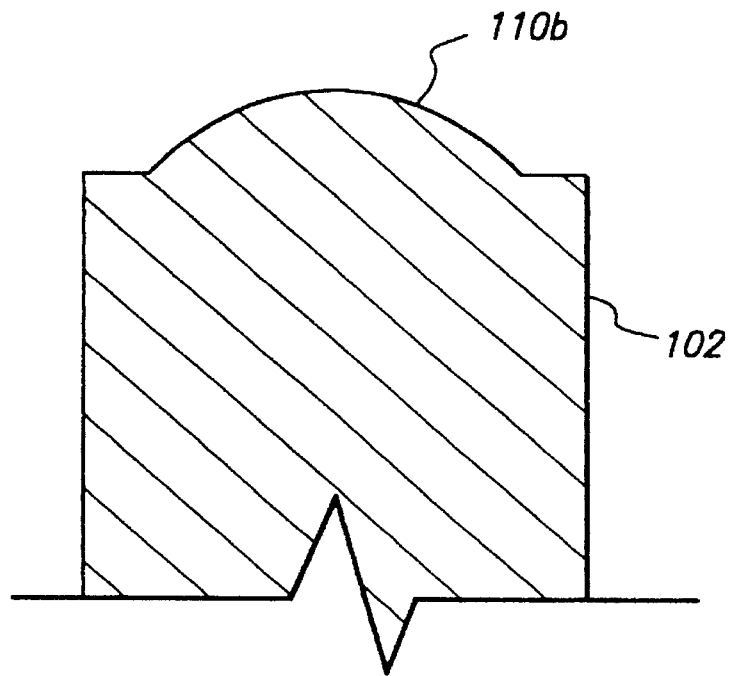
FIG. 5 is a partially cut away side elevational view of one embodiment of the shaped tip spindle shaft of the present invention, illustrating a substantially hemispherical shaped tip.
Figure 6:
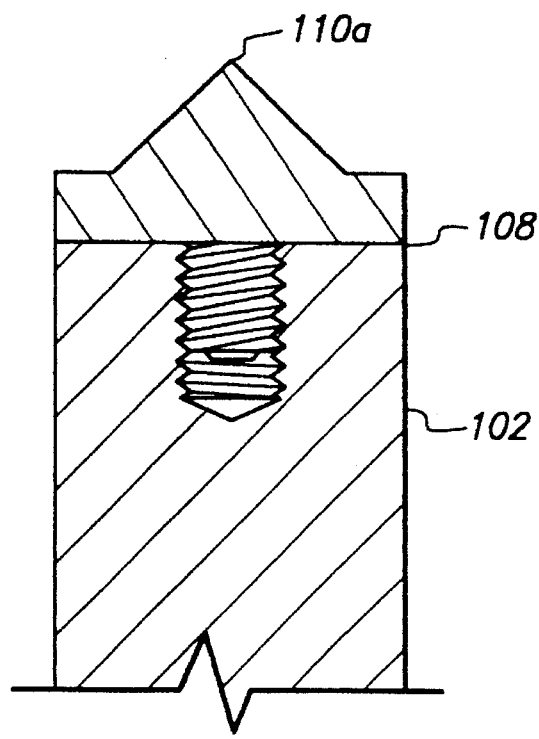
FIG. 6 is a partially cut away side elevational view of the conical tip of the spindle shaft of the present invention, illustrating the configuration for attaching the conical tip to the spindle shaft.

The spindle 102 of the disk drive 100 includes a longitudinally extending central shaft 104 extending from a proximal flange end 106 to an opposite, distal top end 108. The flange end 106 of the spindle 102 is secured in a conventional manner to the baseplate 60 by means of a screw 58 threadably engaging the spindle 102 through a lower recess 62 formed in the structure of the baseplate 60. The top end 108 presents a conical tip 110 which may, in a particular embodiment, have a cross section substantially as shown. The conical tip 110 may comprise a point, a conical or bevelled tip or other frustoconical shape formed at the top end 108 of the spindle 102 or may comprise a rounded hemispherical cross section 110*b* (as illustrated in FIG. 5) sufficient to interact with the substantially planar cover inner surface 114 of the cover 112. Alternatively, the conical tip 110 may be supplied as a separate element 110*a* and threadably engage the top end 108 of the spindle 102 (as illustrated in FIG. 6) or otherwise be affixed thereto in some other manner. When utilized in conjunction with a conical tip 110 having a point at its distal end thereof, the top end of the spindle 102 may interact with the cover inner surface 114 to form an indentation at the point of intersection by compressing the cover 112 toward the baseplate 60 following assembly of the disk drive 100. The cover 112 may be conveniently furnished as a stamped piece of aluminum or other suitable material which is relatively soft compared to the conical tip 110 of the spindle 102. After the cover 112 is placed on the baseplate 60 and secured thereto, the entire assembly may be placed in a press which provides a force 7 (on the order of 50 pounds) sufficient to embed the conical tip 110 of the spindle 102 into the cover inner surface 114 (as illustrated in FIG. 4). Should the disk drive 100 need to be reworked, rebuilt or reassembled, the cover 112 may be discarded and replaced with an additional cover 112.

By virtue of the fact that the recessed cup 72 of the prior art disk drive disk stack 50 (shown in FIG. 2) is obviated by this design, the central shaft 104 of the spindle 102 may be made relatively longer therefore increasing the spacing between the rotational centers of the upper and lower bearings 76, 78 resulting in a greater spacing D2. In a particular application (shown in FIG. 2) wherein the bearing centers are at D1=0.186 inches, a 783 Hz rocking mode frequency has been experienced. However, by utilizing the spindle 102 of the disk drive 100 resulting in a spacing between the bearing centers of the upper and lower bearings 76, 78 wherein D2=0.225 inch, a rocking mode frequency of 947 Hz has been determined for an HDA having the same height form factor even though about 50 Hz of increase may be lost due to somewhat decreased stiffness at the spindle/cover connection.

It has also been determined that merely contacting the cover inner surface 114 with a conical tip 110 having a hemispherical, beveled, or frustoconical cross section (without forming an indentation within the cover inner surface 114 of the cover 112) by pressing the same toward the baseplate 60) results in enhanced stiffness of the spindle 102 with a concomitant increase in the spindle rocking mode frequency. In this application of the technique herein disclosed, it is sufficient for the tip 110 to contact the cover inner surface with a force sufficient to enhance spindle 102 stiffness and yet not allow the tip 110 to move with respect thereto which might otherwise result in particulate contamination of the HDA by metal-to-metal abrasion.

Utilizing the spindle shaft attachment technique herein described, no alignment is necessary between the top end 108 of the spindle 102 with respect to the cover 112. As a result, since perpendicularity of the spindle 102 is achieved by means of the baseplate 60, no screw hole or recessed cone need be formed in, or machined on, the cover inner surface 114 to position the top end 108 of the spindle 102 with respect thereto. As a consequence, the conical tip 110 of the spindle 102 will interact with the cover inner surface 114 at whatever point is determined by the perpendicularity of the spindle 102 established by the baseplate 60 and the spindle 102 will not be forced to any other position which may adversely impact its perpendicularity. The spindle shaft attachment technique herein disclosed allows the use of a relatively inexpensive stamped aluminum cover 112 and only requires that the cover height be controlled to guarantee contact of the conical tip 110 of the spindle 102 with the cover inner surface 114.

What has been provided, therefore, is a spindle shaft attachment technique for a disk drive applicable to both the actuator and disk stack spindles which obviates prior schemes for attaching the spindle to the HDA cover by means of screws or machined recessed cones which limit the length of the spindle shaft and introduce spindle perpendicularity problems in the assembly of the drive. The technique of the present invention allows for the use of a relatively longer spindle shaft for a given height form factor drive and, therefore, allows a greater spacing between upper and lower spindle bearings resulting in greater stiffness and an increased rocking mode frequency. As a consequence, manufacturing yields and drive reliability are improved with a spindle design that is straightforward and readily manufactured.

While there have been described above the principles of the present invention in conjunction with specific apparatus, it is to be clearly understood that the foregoing description is made only by way of example and not as a limitation to the scope of the invention. In particular, it should be noted that the spindle shaft attachment technique disclosed, while described with respect to a disk stack spindle, has similar applicability to a disk drive actuator spindle and will provide similar benefits with respect to allowing increased spacing between bearings resulting in increased stiffness.

What is claimed is:

1. A computer mass storage device disk drive assembly including a data transducer positionable with respect to at least one rotating storage media disk affixed to a central hub rotationally secured to the substantially concentric spindle shaft, said assembly being disposed between a baseplate mounted to a cover, therein defining an enclosure with said spindle shaft being secured to said baseplate at a proximal end thereof and presenting an opposite distal end extending toward said cover, the improvement in the combination comprising:

a conical tip disposed at said distal end of said spindle shaft adjoining said cover, said tip interacting with a substantially planar interior surface of said cover such that when said cover is mounted to said baseplate, said spindle shaft is maintained in a substantially fixed relationship therebetween.

2. The computer mass storage device disk drive of claim 1 wherein said conical tip comprises a point.

3. The computer mass storage device disk drive of claim 2 wherein said cover further comprises:

an indentation in said interior surface of said cover corresponding to said conical tip formed by compressing said cover toward said baseplate during assembly of said disk drive.

4. The computer mass storage device disk drive of claim 1 wherein said conical tip comprises a substantially hemispherical shape.

5. The computer mass storage device disk drive of claim 1 wherein said spindle shaft is secured to said baseplate by a screw threadably engaging said spindle shaft at said proximal end thereof.

6. The computer mass storage device disk drive of claim 1 wherein said cover comprises stamped aluminum.

7. A method for assembling a computer mass storage device disk drive assembly disposed within an enclosure defined within a baseplate mounted to a cover, said method comprising the steps of:

providing a spindle shaft having opposite proximal and distal ends thereof;

disposing a conical tip at said distal end of said spindle shaft;

securing said spindle shaft to said baseplate at said proximal end thereof; and mounting said cover to said baseplate such that a substantially planar interior surface of said cover physically adjoins said conical tip to maintain said spindle shaft in a substantially fixed relationship between said baseplate and cover.

8. The method of claim 7 further comprising the step of:

affixing at least one rotating storage media disk to a central hub rotationally surrounding said spindle shaft;

9. The method of claim 7 further comprising the step of:

affixing at least one access arm to an actuator rotationally surrounding said spindle shaft.

10. The method of claim 7 wherein said step of disposing comprises the step of:

forming said conical tip at said distal end of said spindle shaft.

11. The method of claim 7 wherein said step of disposing comprises the step of:

affixing said conical tip to said distal end of said spindle shaft.

12. The method of claim 11 wherein said step of affixing comprises the step of:

threadably engaging said conical tip to said distal end of said spindle shaft.

13. The method of claim 7 wherein said step of securing is carried out by means of a screw extending through said baseplate and threadably engaging said spindle shaft at said proximal end thereof.

14. The method of claim 7 further comprising the steps of:

compressing said cover and said baseplate; and forming an indentation in said interior surface of said cover corresponding to an intersection point with said conical tip of said spindle shaft.

15. A computer mass storage device disk drive assembly including a data transducer positionable with respect to at least one rotating storage media disk affixed to a central hub rotationally secured to a substantially concentric spindle shaft, said assembly being disposed between a baseplate mounted to a cover, therein defining an enclosure, said spindle shaft being secured to said baseplate at a proximal end thereof and presenting an opposite distal end extending toward said cover, said disk drive assembly comprising:

a conical tip disposed at said distal end of said spindle shaft; and a substantially planar interior surface forming a portion of said cover intended for adjoining said distal end of said spindle shaft and wherein said enclosure is sufficient to provide contact between said substantially planar interior surface and said conical tip when said cover is mounted to said baseplate such that said spindle shaft is maintained in a substantially fixed relationship with respect thereto.

16. The computer mass storage device disk drive of claim 15 wherein said conical tip comprises a point.

17. The computer mass storage device disk drive of claim 16 wherein said cover further comprises:

an indentation in said interior surface of said cover corresponding to said conical tip formed by compressing said cover toward said baseplate during assembly of said disk drive.

18. The computer mass storage device disk drive of claim 15 wherein said conical tip comprises a substantially hemispherical shape.

19. The computer mass storage device disk drive of claim 15 wherein said spindle shaft is secured to said baseplate by a screw threadably engaging said spindle shaft at said proximal end thereof.

20. The computer mass storage device disk drive of claim 15 wherein said cover comprises stamped aluminum.

* * * * *